(12) United States Patent
Tual et al.

(10) Patent No.: US 6,194,853 B1
(45) Date of Patent: Feb. 27, 2001

(54) INSTALLATION FOR OPERATING AT LEAST ONE SEAT MODULE

(75) Inventors: Frederic Tual, Saint-Nazaire; Guy Renault, Epinay/Seine; Thierry Marin-Martinod, Nesles la Vallee, all of (FR)

(73) Assignee: Labinal, Montigny le Bretonneux (FR)

( * ) Notice: Subject to any disclaimer, the term of this patent is extended or adjusted under 35 U.S.C. 154(b) by 0 days.

(21) Appl. No.: 09/353,092

(22) Filed: Jul. 15, 1999

(30) Foreign Application Priority Data

Jul. 16, 1998 (FR) .................................................. 98 09113

(51) Int. Cl.$^7$ ....................................................... B64C 1/22
(52) U.S. Cl. ........................ 318/266; 318/466; 244/118.6
(58) Field of Search .................................. 318/51, 53, 54, 318/59, 264, 265, 266, 280, 283, 286, 466, 467, 468, 625, 626; 244/118.5, 118.6

(56) References Cited

U.S. PATENT DOCUMENTS

| | | | |
|---|---|---|---|
| 4,622,551 | * 11/1986 | Kupersmith et al. | 340/825.06 |
| 4,667,191 | * 5/1987 | Comroe et al. | 340/825.5 |
| 4,706,194 | * 11/1987 | Webb et al. | 364/424 |
| 5,019,759 | 5/1991 | Takemura et al. . | |
| 5,097,185 | 3/1992 | Ogasawara . | |
| 5,406,270 | * 4/1995 | Van Lente | 340/825.34 |

FOREIGN PATENT DOCUMENTS 195 06 764  8/1995  (DE) .
0 761 494   3/1997  (EP) .
2 748 240   11/1997 (FR) .

OTHER PUBLICATIONS

JP Absts. of Japan, European Patent Office; Pub No. 05112165. May 7, 1993; Inventor: Nishiyama, K.; Title: Control Device For Seat Of Vehicle.

* cited by examiner

*Primary Examiner*—Bentsu Ro
(74) *Attorney, Agent, or Firm*—Larson & Taylor, PLC

(57) ABSTRACT

The invention relates to an installation for operating seat modules (12) equipped with an assembly of actuators (30, 32, 34, 36, 38, 40, 42, 44) each intended for adjusting a seat element (22, 24, 26, 28). It comprises a control unit (16) suited to each seat module (12). This control unit (16) comprises means (62) for the acquisition of variables representing the functioning state of the seat module.

A central unit (18) for the management of the seat modules (12) is connected to the control unit (16). It comprises means (96) for the transmission of information toward the control units (16).

Each control unit (16) comprises means (66) for the transmission of variables representing the functioning state of the associated seat module toward the central management unit (18).

Use in aircraft seats.

8 Claims, 2 Drawing Sheets

INSTALLATION FOR OPERATING AT LEAST ONE SEAT MODULE

The present invention relates to a device for controlling at least one seat module equipped with an assembly of actuators each intended for adjusting a seat element, of the type comprising:

a control unit, suited to the or to each module, for controlling the actuators of the associated seat module from the means for the input of commands, said control unit comprising means for acquiring variables which represent the functioning state of the seat module and which are measured by sensors mounted on said seat module;

a central unit for the management of the seat modules, which is connected to the or to each control unit, said central management unit comprising means for the transmission of information toward the or each control unit.

The term"seat module" designates a single seat or an assembly of interconnected seats which are capable of receiving two, three or four persons.

Such an operating installation is described, for example, in the document WO-97/42050, where it is applied to aircraft seats.

In this document, each seat module is associated with its own control unit. The latter comprises means for the input or logging of commands, such as a keyboard. The logging of a command causes the displacement of one of the seat elements.

In the installation described in the abovementioned document, the various control units of the same aircraft are connected to one another by means of an external bus, in order to make it possible to control a plurality of seats from the same command input means.

The command input means comprise, furthermore, a memory card reader. The card as described contains parametrising information corresponding, for example, to the end positions of each actuator.

The control units are configured on the basis of parametrising information stored in the memory card, said information being stored in the control units.

Thus, by means of such an installation, it is possible, without any direct manual action on the actuators, to define the end positions of the latter and therefore the permissible displacement travel of the actuators.

In a particular embodiment of the installation, the actuators are each equipped with a sensor for readings of a variable representing its functioning state and therefore the functioning of the associated seat module. These sensors are formed, for example, by potentiometers, the two moveable parts of which are secured to two associated moveable parts of each actuator.

The variables measured by each sensor are used by the control unit suited to the seat module, in order to ensure an open-loop control of the actuator associated with the sensor.

The installation described in the abovementioned document makes it possible to dispense with any mechanical action on the seat module in order to define predetermined functioning ranges for each actuator. In fact, these ranges are defined in the control unit by means of the storage of the end positions of each actuator.

However, the production tolerances in the seats and, in particular, the production tolerances in the actuators integrated in these cause appreciable offsets in the actual positions of the seat elements, even though the commands applied to the corresponding actuators are identical and ought to have driven the seat elements into similar positions.

Difficulties in appropriately configuring each of the seats arise as a result.

In particular, it is difficult to align the backs of the adjacent seats, since an aligned position of the seat backs often corresponds to different positions of the actuators associated with the backs.

The object of the invention is to provide an operating installation making it possible to configure and control the seat modules of an aircraft in a simple way and, in particular, making it possible to compensate the production tolerances in the seat modules and in the actuators which they comprise.

For this purpose, the subject of the invention is an installation for operating at least one seat module equipped with an assembly of actuators each intended for adjusting an element of the seat module, of the abovementioned type, characterized in that the or each control unit comprises means for the transmission of at least some of the variables representing the functioning state of the associated seat module toward the central management unit, and in that said central management unit comprises means for processing said transmitted variables.

According to particular embodiments, the operating installation comprises one or more of the following characteristics:

the central management unit comprises means for preparing a request for demanding variables representing the functioning state of at least one of the seat modules, the information transmission means being designed to send this request toward the or each associated control unit, and the transmission means of the or each control unit are designed to send the representative variables demanded toward the central management unit, the central management unit comprises means for the input of commands for controlling the actuators of at least one seat module, and the information transmission means are designed to send the commands toward the control unit associated with the or with each seat module to be controlled, the or each control unit executing the commands received from the central management unit, the central management unit comprises means for displaying said representative variables received from the or each control unit, the central management unit is removable, it comprises an external bus, to which the central management unit and the or each control unit are connected, the or each control unit comprises means for the processing and storage of variables representing the functioning state of the associated seat module, and the transmission means of the or each control unit are designed to send the processed and stored representative variables toward the central management unit, the or each control unit comprises, on the one hand, means for evaluating the intensity supplied to each actuator and, on the other hand, means for controlling the or each actuator in the opposite direction when the intensity supplied to the actuator departs from a predefined range, and the or each control unit comprises means for interrupting the oppositely directed control of the actuator after an oppositely directed displacement of the actuator greater than a predefined displacement or after the completion of a predefined period of time, the first of the conditions which is satisfied terminating the oppositely directed control of the actuator.

The invention will be understood better from a reading of the following description given purely by way of example and made with reference to the drawings in which.

Figure 1:
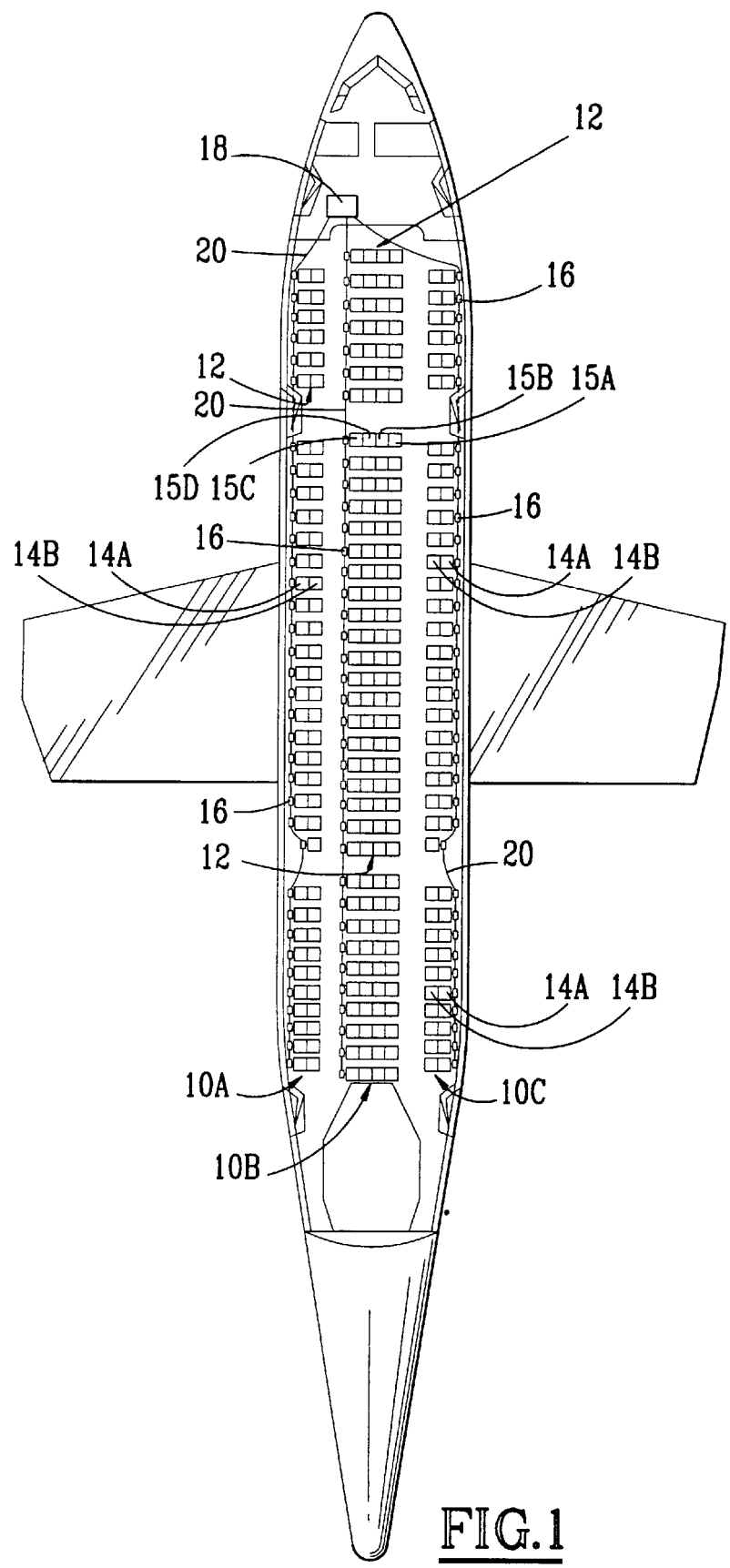
FIG. 1 is a top view of the interior outfitting of an aircraft.

The interior outfitting of the aircraft illustrated in FIG. 1 comprises three rows 10A, 10B, 10C of seat modules 12 aligned one behind the other. Each lateral seat module comprises two adjacent motorized seats 14A, 14B. The seat modules of the central row 10B comprise four adjacent seats 15A, 15B, 15C, 15D.

The seats of the same module are carried by a common frame, by means of which they are fastened to the floor of the aircraft. Electric actuators equip each seat so as to ensure the motorized displacement of the various moveable elements of the seat.

As illustrated in FIG. 1, each seat module 12 is associated with a control unit 16. This control unit is designed to control the actuators of the associated seat module.

The control units 16 of all the seat modules of the aircraft are connected to a central management unit 18 by means of an external bus 20.

Figure 2:
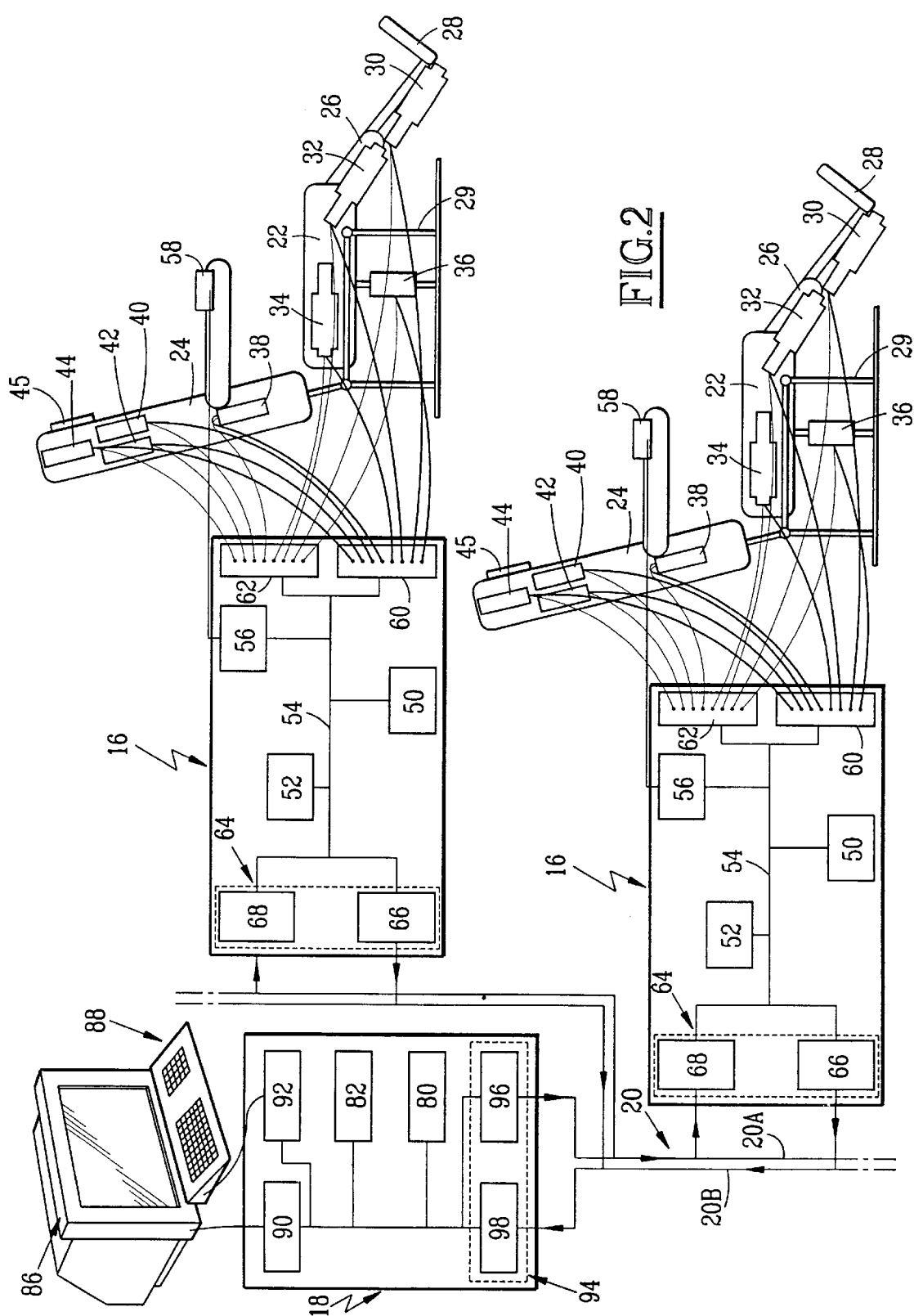
FIG. 2 is a diagrammatic view of the operating installation according to the invention, in which only two seats are illustrated.

FIG. 2 illustrates two seats of two separate seat modules, for example two adjacent seat modules of the two rows 10A and 10B.

Each seat comprises a sitting surface 22, a back 24, a legrest 26 and a footrest 28. These various elements are displaceable relative to one another and, furthermore, are mounted so as to be moveable relative to a frame 29 of the seat module.

In order to displace the various moveable elements, each seat comprises an actuator 30 for the displacement of the footrest, an actuator 32 for the displacement of the legrest and an actuator 34 for inclining the back. It comprises, furthermore, an actuator 36 for tilting the sitting surface. An actuator 38 for displacing the lumbar support is integrated into the back 24. Moreover, three actuators 40, 42, 44 are installed in the upper part of the back 24, in order to ensure the movement of a head restraint 45. These actuators are designed respectively for adjusting the height of the head restraint, for tilting it and for turning down lateral flaps of the head restraint in order to hold the head.

Each actuator is equipped with a position sensor designed to supply a value representing the instantaneous position of the moveable part of the actuator relative to its fixed part. This sensor is, for example, a rotary or straight potentiometer, depending on the type of actuator with which it is associated.

In FIG. 2, each seat is associated with a control unit 16. In practise, each control unit 16 is associated with a seat module comprising two or four seats, not with a single seat, as illustrated.

The control units 16 are connected to an electric power feeder line which is not illustrated.

Each control unit 16 comprises an information processing module 50, such as a microcontroller, and storage means 52 intended for storing programs for controlling the seat module and also data or variables necessary for the functioning of the latter.

The various members of the control unit 16 are connected to one another by means of an internal bus 54. Provided on this bus, for each seat of the seat module, is an interface 56 for the connection of a control keyboard 58 installed on the armrest of the seat.

The control keyboard 58 of each seat comprises, for each actuator of the seat, two control buttons making it possible to displace the associated actuator in two opposite directions.

The control unit 16 comprises, furthermore, a power control interface 60, to which each actuator of the associated seat module is connected separately. The cables connecting the actuators to the interface 60 are illustrated diagrammatically in FIG. 2. In practise, these cables are concealed in the lining of the seat module.

The power control interface 60 is designed to supply the electric energy necessary for the functioning of each actuator for the purpose of displacing the latter in one direction or the other. It therefore comprises an output for each actuator. The feed of one of the actuators or the other and its displacement are operated by the power control interface under the control of the microcontroller 50, in particular as a function of the commands logged from the keyboard 58.

Moreover, the control unit 16 comprises an information acquisition interface 62. This interface comprises an information acquisition input for each actuator. This input is connected to the potentiometric position sensors associated with the actuators.

The information acquisition interface 62 is designed to acquire the information from the sensor associated with each actuator in response to a demand for information emanating from the microcontroller 50. Said interface comprises, in particular, an analog/digital converter designed to make the analog signal supplied by each sensor processable by the microcontroller 50. Thus, the information acquisition interface supplies the microcontroller 50 with a variable representing the position of the associated actuator.

Furthermore, means 64 for the bidirectional transmission of information between the control unit 16 and the central management unit 18 are integrated into the control unit 16.

These information transmission means 64 comprise, on the one hand, means 66 for the transmission of information toward the central management unit 18 and, on the other hand, means 68 for the reception of information transmitted by the central management unit 18.

The means 64 are connected to the external bus 20. The latter is of any suitable type and conforms, for example, to the standard RS 485. For the sake of clarity, the bus 20 is illustrated in the drawings as comprising two filamentary supports 20A, 20B, each intended for transferring information in one direction between the units 16 and 18. In practise, this information is conveyed on the same support.

The central management unit 18 comprises an information processing module 80, such as a microcontroller, and a memory 82. The various members of the central management unit are connected to one another by means of an internal data transfer bus 84. An information display screen 86 and an information collection keyboard 88 are connected to the bus 84 by means of suitable interfaces designated by 90 and 92.

Furthermore, means 94 for the bidirectional transmission of information are integrated into the central management unit 18 and are connected to the internal bus 84. These transmission means 94 are connected to the external bus 20 for the bidirectional transmission of information between the control unit 16 and the central management unit 18.

For this purpose, the bidirectional transmission means 94 comprise information transmission means 96 and information reception means 98.

A control program is stored in the memory 52 of each control unit 16. It is designed to manage the functioning of the latter. It is capable, in particular, of controlling each actuator as a function of commands collected by the user from the keyboard 58.

Thus, when a command is received, the microcontroller 50 controls the power control interface 60, so that the latter feeds an actuator as long as the corresponding key of the keyboard 58 is kept depressed.

While the actuator is functioning, the microcontroller 50 checks the satisfactory displacement of the actuator by means of the associated sensor. The result of the measurement is acquired by the interface 62 and communicated to the microcontroller 50. Thus, during the displacement of a seat element under the action of an actuator, the latter is controlled in open loop by the unit 16.

Moreover, the maximum permissible displacement range of each actuator is stored in the memory 52. For this purpose, threshold values corresponding to the permissible end positions of the actuator are stored in the control unit 16.

During the displacement of an actuator, the microcontroller 50 periodically checks that the value recorded by the sensor associated with the actuator is within the permissible displacement range. If the value recorded by the sensor reaches one of the thresholds, the feed of the actuator from the power control interface 60 is interrupted.

The unit 16 comprises means integrated into the power control interface 60 and designed to evaluate the instantaneous intensity I applied to each actuator and also its derivative with respect to the time dI/dt. The values of the intensity I and of its derivative dI/dt are compared continuously with predetermined maximum values.

If these maximum values are exceeded, thus representing a blockage of the moveable element controlled by the actuator or a malfunction of the latter, the execution of the command in progress is abandoned and the actuator is controlled in the opposite direction until one of the two following conditions is satisfied, namely the retraction of the actuator by the amount of a predetermined value or the completion of a predetermined period of time.

The implementation of the two alternative conditions ensures that one of the conditions or the other is satisfied, thus avoiding an uninterrupted retraction of the actuator. In fact, it is possible for the sole condition relating to the extent of retraction never to be satisfied, particularly if the position sensor is defective or if the actuator is in an end position.

The program stored in the memory 82 and intended for managing the functioning of the central unit 18 is designed to send information toward the control unit 16 and to acquire information from this control unit 16.

In particular, the central management unit 18 makes it possible to log the permissible displacement range of each actuator from the keyboard 88. The thresholds thus defined are transmitted toward the control unit 16 of the associated seat module by the transmission means 96. The thresholds are then stored in the memory 52 in order to be used during the control of the associated seat.

Moreover, the central management unit is designed to prepare commands for all or some of the actuators and to send these commands to the control units which operate the actuators accordingly.

Furthermore, the central management unit 18 is designed to address to the control unit 16 requests corresponding to demands for information relating to the value measured by one or other of the sensors associated with the actuators.

When such a request is received, the control unit 16, by way of the transmission means 66, returns the value measured by the corresponding sensor.

This value, which is transmitted to the reception means 98 by the bus 20, is then processed by the microprocessor 80. In particular, this value is displayed on the screen 86, allowing it to be made available to a technician or an air hostess.

Thus, it is possible, at any moment, to know the value representing the position of any one of the actuators from the central management unit 18.

During the configuration of the seat modules, and particularly during the storage of the permissible displacement ranges of the actuators, the technician records, for two aligned adjacent seats, the value which is given by each sensor of the two seats. On account of the production tolerances in the seats, these values are generally close to one another, but not identical, even though the two seats are in identical positions.

So that the limit positions of the two adjacent seats are identical, the operator imposes an offset on the threshold values defining the permissible displacement ranges associated with the actuators of each seat.

Thus, the moveable elements of the two seats have identical actual displacements, despite the values recorded by the various sensors.

Moreover, in order to determine the permissible displacement ranges, the operator takes, from a central management unit 18, readings of values representing the position of each actuator for various positions of the seat.

For this purpose, he displaces the various seat elements by controlling the seat from the keyboard 58. Then, for certain particular positions of the seat, he determines the values representing the position of each actuator by a direct readoff on the screen 86.

The values thus recorded are processed for the purpose of configuring the other seats of the aircraft, the offsets attributable to the production tolerances in the seats being taken into account.

The necessary compensations due to the production tolerances may be calculated automatically by means of a setting program carried out in a central management unit 18.

Moreover, the control unit 16 comprises a program designed to store in the memory 52 a functioning history of each of the actuators of the associated seat modules [sic]. In particular, this program is designed to determine the cumulative functioning duration of each actuator, as well as the total current consumption of the latter.

This information is communicated to the central management unit 18 at the request of the latter. This information is then processed by the central management unit 18, particularly in order to ensure preventive maintenance of the seat modules.

The central management unit 18 may be mounted permanently in the aircraft, for example in the pilot's cockpit, or else be removable, said unit being connected to the seat modules only during phases of configuration or maintenance of the latter.

Moreover, the external network 20 may be omitted. The central management unit 18 is then connected successively to the control unit 16 of each seat module with the aid of a suitable connector.

According to a first embodiment, the central management unit 18 comprises a PC-type microcomputer, into which is loaded a suitable program allowing bidirectional communication with the control modules 16.

Alternatively, the central management unit 18 is a pocket-size computer or a portable module developed specifically for this use.

In the example described, the sensors are carried by the actuators themselves. Alternatively, however, the sensors are arranged directly between two moveable elements of the seat module.

What is claimed is:

1. An installation for operating a plurality of seat modules each equipped with an assembly of actuators each intended for adjusting an element of the associated seat module, said installation comprising:

a plurality of control units, each individually associated with one of said seat modules, for controlling the actuators of the associated seat module from means for the input of commands, said control units each comprising means for the acquisition of variables which represent the functioning state of the associated seat module and which are measured by sensors mounted on said associated seat module; and a common central management unit for the management of the seat modules, which is connected to each control unit, said common central management unit comprising information transmission means for transmitting information to each control unit, each control unit comprising transmission means for transmitting at least some of the variables representing the functioning state of the associated seat module to the common central management unit, and said common central management unit comprising means for processing the transmitted variables.

2. An installation according to claim 1, wherein the common central management unit comprises means for preparing a request for demanding variables representing the functioning state of at least one of the seat modules, and wherein the information transmission means sends said request to each associated control unit, and wherein the transmission means of each control unit sends the representative variables demanded to the common central management unit.

3. An installation according to claim 1, wherein the common central management unit comprises means for the input of commands for controlling the actuators of at least one seat module, and wherein the information transmission means sends the commands to the control unit associated with each seat module to be controlled, each control unit executing the commands received from the common central management unit.

4. An installation according to claim 1, wherein the common central management unit comprises means for displaying said representative variables received from each control unit.

5. An installation according to claim 1, wherein the common central management unit is removable.

6. An installation according to claim 1, further comprising an external bus to which the common central management unit and each control unit are connected.

7. An installation according to claim 1, wherein each control unit comprises processing and storing means for processing and storing variables representing the functioning state of the associated seat module, and the transmission means of each control unit sends the representative variables processed and stored by said processing and storing means to the common central management unit.

8. An installation according to claim 1, wherein each control unit comprises both means for evaluating the intensity of control signals supplied to each actuator and means for controlling each actuator in the opposite direction when the intensity of said control signals supplied to the actuator departs from a predefined range, each control unit comprising means for interrupting the oppositely directed control of the actuator after conditions comprising one of an oppositely directed displacement of the actuator greater than a predefined displacement and the passage of a predefined period of time, and the first of the conditions which is satisfied terminating the control of the actuator in the opposite direction.

* * * * *